United States Patent Office 3,369,060
Patented Feb. 13, 1968

3,369,060
ALKYLENE OXIDE REACTION PRODUCT
WITH POLYPHOSPHORIC ACIDS
Paul E. Pelletier, Bartlett, and Floy Pelletier, Lockport,
Ill., assignors to Wyandotte Chemicals Corporation, a
corporation of Michigan
No Drawing. Original application Aug. 28, 1959, Ser.
No. 836,580. Divided and this application Aug. 4, 1966,
Ser. No. 570,175
12 Claims. (Cl. 260—933)

The present application is a division of our copending application Ser. No. 836,580, filed Aug. 28, 1959, entitled "Polyurethane Compositions."

The present invention relates to polyurethane compositions produced by reaction of polyisocyanates with hydroxy compounds produced by reaction of alkylene oxides with certain selected phosphorus-containing acids. The invention includes mixtures of polyisocyanates with the alkylene oxide-phosphorus acid reaction products as well as the polyurethane resins possessing improved resistance to burning and flame propagation which may be produced therefrom. Outstanding results are obtained when the polyurethane resin-producing reaction takes place in the presence of water or other blowing agent to produce polyurethane foams which are characterized by non-inflammability and the capacity to self-extinguish fires.

In accordance with the invention an alkylene oxide is reacted with a phosphorus-containing acid which corresponds to a mixture of phosphorus pentoxide and water containing from 75 to 90% by weight of phosphorus pentoxide with from 10–25% by weight of water. Representative phosphorus-containing acids which are usable are metaphosphoric acid and pyrophosphoric acid. Additionally, various mixtures prepared by dissolving phosphorus pentoxide in water to provide phosphorus pentoxide-water mixtures within the range of proportions specified may be used. In these mixtures, the phosphorus-containing acids which may be formed by dissolution of the phosphorus pentoxide in water may exist in polymeric form. Partial esters such as partial alkyl esters of the above defined phosphorus-containing acids may also be used so long as esterification of the acid leaves a residue of at least one OH group per phosphorus atom in the acid. Partial esters are illustrated by the mono- and diesters of pyrophosphoric acid, such as dimethyl acid pyrophosphate and monoethyl acid pyrophosphate.

The alkylene oxides which may be used are preferably illustrated by ethylene oxide, propylene oxide, butylene oxide and styrene oxide. The preferred oxides contains the 1,2 epoxy group, but the invention is not so limited and 2,3 butylene oxide may be used. The invention includes epichlorohydrin and other halohydrins such as epiiodohydrin, epifluorohydrin, epibromohydrin, etc., and higher molecular weight oxides such as octylene oxide as well as dioxides (diepoxides) illustrated by the diglycidyl ether monomer of bisphenol A. Halogenated alkylene oxides such as epichlorohydrin may also be used.

It is known as taught, for example, in United States Patent 2,372,244, to react phosphoric acid or phosphorus acid with olefin oxides to produce reaction products possessing primary hydroxyl groups as indicated by the reaction equations set forth in said patent.

The products of the invention are very different from those of Patent 2,372,244 since when sufficient propylene oxide is reacted with phosphoric acid or phosphorus acid (about 6 mols of oxide per mol of acid) to produce a neutral product sufficiently reactable with polyisocyanates for polyurethane foam production, the foam product is not self-extinguishing or non-inflammable. Using the phosphorus pentoxide-water mixtures specified by the invention, reaction with alkylene oxides may be effected to provide at least substantially neutral products which are reactive with polyisocyanates to form non-inflammable and self-extinguishing polyurethane foams.

At least one epoxy equivalent of alkylene oxide is reacted with each hydroxyl equivalent of the phosphorus-containing acid. Preferably, the reaction is continued further to provide an at least substantially neutral reaction product in which at least two epoxy groups are reacted per hydroxy equivalent in the starting phosphorus-containing acid.

The reaction products of the invention are hydroxy-containing materials. These may be used along for reaction wtih polyisocyanates or in admixtures with other compounds reactive with polyisocyanates such as hydroxy-containing polyesters and polyethers. Whatever proportion of the reaction product of the invention is used in the mixture provides an improvement in fire resistance and it is preferred to use enough to provide self-extinguishing characteristics to the foam product. The self-extinguishing characteristic is determined in accordance with method D365–56T of the American Society for Testing Materials.

The reaction of alkylene oxides with phosphorus-containing acids in accordance with the invention can be performed at various pressures, atmospheric and superatmospheric pressures, and the temperature of reaction can vary from 50 to 500° F. Low temperature operation, while possible, is inconvenient because the reaction is exothermic and proceeds more rapidly as the temperature is increased. Temperatures above 220° F., though useful, are less desirable because the products tend to darken. Preferred reaction temperature is within the range of 140–190° F. providing an easily controlled reaction without darkening of the product.

The reaction is preferably effected by incremental addition of the alkylene oxide to the hot phosphorus-containing acid, though this is not essential. Desirably, the phosphorus-containing acid is maintained at a temperature of 90–120° F. by cooling while the alkylene oxide is added. This prevents local over-heating and excessive reaction temperature which may result from the exothermic reaction. After the alkylene oxide addition has been completed and the reactants intimately mixed together by stirring, the temperature is desirably raised slowly to the preferred reaction temperature and held at this temperature until the reaction has been completed. Completion of the reaction may be determined by the substantial exhaustion of alkylene oxide from the reaction mixture or, conveniently, by the achievement of a substantially neutral pH. Any slight excess of alkylene oxide which may be present at the completion of the reaction can be removed by heat under vacuum.

The invention is illustrated in the following examples:

EXAMPLE I

Phosphorus pentoxide is added to water with constant stirring with external cooling and addition is continued until 3.94 parts of phosphorus pentoxide are dissolved per part of water. The phosphorus-containing acid so produced is a viscous, clear and highly dense liquid from which pure pyrophosphoric acid crystallizes on standing.

426 grams of the phosphorus-containing acid so-produced is placed in a two liter flask and heated to 90–120° F. with stirring whereupon 1588 grams of 1,2 propylene oxide is added continuously while the flask is cooled to maintain a temperature of from 90–120° F. In this way, 27.4 mols of propylene oxide is mixed with 9.6 hydroxy equivalents of the phosphorus-containing acid. After all the propylene oxide is added (the exotherm decreases toward the end of the propylene oxide addition) the temperature is raised slowly to 150–170° F. and held at this temperature for 1½ hours. The product at this point is essentially neutral upon titration and contains a slight excess of propylene oxide which is removed by application of vacuum while maintaining a temperature of 150–170° F.

The final yield is 1911 grams corresponding to the reaction of 25.6 mols of propylene oxide and providing a product in which the ratio of reacted epoxy group to hydroxyl radical in the initial phosphorus-containing acid is about 2.7:1. The product has an actual hydroxyl number by acetylation method of 275, acidity of 0, and a viscosity of 1440 centipoises measured at 77° F.

EXAMPLE II

A typical foaming composition was prepared using the hydroxy compound obtained in Example I as follows:

*Quasi prepolymer composition*

Parts:
- 32.1 — Hydroxy compound of Example I.
- 67.9 — Toluene diisocyanate (80/20 mixture of the 2,4 and 2,6 isomers). Mixed and allowed to exotherm while stirring for 50 minutes, heat to 200° F. for 25 minutes and then allow to cool to room temperature. Analyzed NCO 21.2%.

*Foaming mixture*

Parts:
- 50.9 — Quasi prepolymer composition.
- 15.3 — Trichloromonofluoromethane (blowing agent).
- 26.6 — Polyester resin produced by condensing adipic acid with ethylene glycol to provide a condensate having an hydroxyl number of 480.
- 6.69 — Hydroxy compound of Example I.
- .24 — Triethylamine.
- .27 — Wetting agent—Silicone X–520 (Union Carbide and Carbon) a dimethyl end-blocked silicone.

The composition set forth above foams to produce a very fine celled foam product having excellent tensile strength and load bearing qualities. It is self-extinguishing according to ASTM Method D635–56T.

It will be observed that the foaming composition of Example II includes a proportion of a polyester which functions to improve the physical properties of the foam product. Various polyesters or polyethers may be used having an hydroxyl number in the range of 250 to 700 in order to improve the physical properties of the foam product.

Polyesters of polycarboxylic acids with polyols such as glycols are preferred, the glycol reactant being used in excess to provide hydroxyl functionality in the desired range. Polyethers may also be used such as high molecular weight epoxy resins in which the repeating unit contains secondary hydroxyl groups. Similarly, esters of these epoxy resins in which the epoxy groups are reacted but the hydroxyl groups are unreacted are also suitable.

From 15 to 60 parts of the polyester or polyether component is desirably used for every 85 to 40 parts of the hydroxy compounds of the invention which are present in the foaming mixture. These polyesters or polyethers preferably possess an hydroxyl number of from 450 to 480.

It will be appreciated that the polyester component can be omitted from Example II while still providing self-extinguishing foams although the foam products possess less desirable tensile strength and load bearing properties.

EXAMPLE III

Phosphorus pentoxide is added to water with constant stirring with external cooling and addition is continued until 4.73 parts of phosphorus pentoxide are dissolved per part of water. The phosphorus-containing acid so produced is a viscous, clear and highly dense liquid.

400 grams of the phosphorus-containing acid so produced is placed in a two liter flask and heated to a 90–120° F. with stirring whereupon 1500 grams of 1,2 propylene oxide is added continuously while the flask is cooled to maintain a temperature of from 90–120° F. In this way, 25.9 mols of propylene oxide is mixed with 7.75 hydroxy equivalents of the phosphorus-containing acid. After all the propylene oxide is added the temperature is raised slowly to 150–160° F. and held at this temperature for 1 hour. The product at this point is essentially neutral upon titration and contains a slight excess of propylene oxide which is removed by application of vacuum while maintaining a temperature of 150° F. The final yield is 1700 grams corresponding to the reaction of 22.4 mols of propylene oxide and providing a product in which the ratio of reacted epoxy group to hydroxyl radical in the initial phosphorus-containing acid is about 2.9:1. The product has an actual hydroxyl number by acetylation method of 248 and a viscosity of 1,620 centipoises measured at 77° F.

EXAMPLE IV

A typical foaming composition was prepared using the hydroxy compound obtained in Example III as follows:

*Quasi prepolymer composition*

Parts:
- 34.6 — Hydroxy compound of Example III.
- 65.4 — Toluene diisocyanate (80/20 mixture of the 2,4 and 2,6 isomers). Mixed and allowed to exotherm while stirring for 30 minutes, heat to 270° F. for 2 hours and then allow to cool to room temperature. Analyzed NCO 22.1%.

*Foaming mixture*

Parts:
- 52.3 — Quasi prepolymer composition.
- 15.93 — Trichloromonofluoromethane (blowing agent).
- 31.3 — Polyester resin produced by condensing adipic acid with ethylene glycol to provide a condensate having an hydroxyl number of 480.
- .22 — Triethylamine.
- .25 — Wetting agent—Silicone X–520 (Union Carbide and Carbon) a dimethyl end-blocked silicone.

The composition set forth above foams to produce a very fine celled foam product having excellent tensile strength and load bearing qualities. It is self-extinguishing according to ASTM Method D635–56T.

It will be understood that the production of the polyurethane foam may be accomplished in various ways known to the art, the foam production illustrated in Examples I–IV being simply illustrative. In this regard, reference is made to the text entitled "Polyurethanes" by Bernard A. Dombrow, published by Reinhold Publishing Corporation, 1957, where reference is made to various techniques for the production of polyurethane foams, including the "one-shot" procedure as well as various procedures including polyurethane prepolymers.

The following is a further example of a method of forming a hydroxy compound in accordance with the invention which may be reacted with a polyisocyanate as in Example II or Example IV to produce a self-extinguishing polyurethane composition as herein described.

EXAMPLE V

A two liter, three neck flask was fitted with a reflux condenser, stirring motor, thermometer, and addition tube connected to a separatory funnel for continuous addition of epichlorohydrin.

Triphosphoric acid was first prepared by adding slowly, 61.8 parts by weight of phosphorus pentoxide to 38.2 parts by weight of a 75% orthophosphoric acid solution. Constant stirring is necessary to completely react or dissolve the oxide. The temperature should be kept below 220° F. during the first addition of oxide to prevent excessive water vapor loss.

348 gms. or 1.35 moles of the above acid were weighed into the two liter flask and about 1340 gms. or 14.5 moles of epichlorohydrin were added continuously at a temperature of 160–180° F. After all the epichlorohydrin was added, the product was heated to 250° F. for two hours. At the end of this reaction, the product titrated neutral with sodium hydroxide. Any excess, unreacted epichlorohydrin was removed by vacuum distillation at 250° F.

The final yield was 1670 gms. which indicates that 1430 moles of epichlorohydrin were added.

The final product has a pH of 5 but titrates as an essentially neutral compound. It is a clear, wine colored liquid which is insoluble in water and soluble in alcohol. Its hydroxyl number is 226. Similar products having a pH ranging from 2 to 6 are useful in accordance with the invention.

In a foam producing mixture in accordance with the invention, the stated presence of a polyisocyanate component is intended to include the polyisocyanate compound per se, such as toluene diisocyanate, or a reaction product of the polyisocyanate which liberates free polyisocyanate when heated, such as a compound with phenol, or a quasi-prepolymer of the monomeric polyisocyanate which provides isocyanate polyfunctionality, such as the prepolymers illustrated in the present examples.

Any polyisocyanate will react with the hydroxy compounds of the invention such as toluene diisocyanate (pure or mixed isomers), hexamethylene diisocyanate, 1,5-naphthalene diisocyanate, methylene bis-4-phenyl isocyanates, etc., however the preferred isocyanates are the various commercial toluene diisocyanates because of their availability and desirable physical properties which are well understood by the art.

As is conventional, the foaming composition includes a blowing agent. This term includes various types of materials which are known to possess an expanding function. Thus, water reacts with isocyanate to produce carbon dioxide gas thereby providing a blowing agent which enters into the polymerization reaction providing an internal blowing agent. External blowing agents which expand or decompose to yield gaseous products, normally upon increase in temperature, may also be used. These are termed external agents because they do not enter into the isocyanate polymerization reaction. External blowing agents are illustrated by the material generally known as Freons which are lower molecular weight hydrocarbons usually containing both fluirine and chlorine substitutents. Other external blowing agents are illustrated by sodium and ammonium bicarbonate, etc.

As is generally accepted in the urethane art when preparing a foam the equivalents of isocyanate are preferably approximately equal to the equivalents of hydroxyls (or other radicals providing active hydrogen) designed to react with the polyisocyanate to produce the urethane polymer. The ratio of isocyanate to hydroxyl can vary considerably in accordance with the invention in the same manner as is known for the conventional hydroxyl-containing materials known to the art.

The invention is defined in the claims which follow.

We claim:

1. A composition of matter comprising the substantially neutral hydroxy reaction product of an oxide selected from the group consisting of ethylene oxide, propylene oxide, butylene oxide and styrene oxide with a phosphorus acid selected from the group consisting of phosphorus acids which correspond to a mixture of from 75–90% by weight of phosphorus pentoxide with from 10–25% by weight of water and partial alkyl ethers of said acids having a residue after esterification of at least one OH group per phosphorus atom, said hydroxy reaction product containing at least one reacted epoxy group per hydroxyl equivalent of said acid.

2. The reaction product claimed in claim 1 which contains from 2.7–2.9 reacted epoxy groups per hydroxyl equivalent of said acid.

3. A composition of matter comprising the substantially neutral reaction product of an oxide selected from the group consisting of ethylene oxide, propylene oxide, butylene oxide and styrene oxide with a phosphorus acid which corresponds to a mixture of from 75–90% by weight of phosphorus pentoxide with from 10–25% by weight of water.

4. A composition of matter as recited in claim 3 in which said oxide is propylene oxide.

5. A composition of matter as recited in claim 3 in which said acid is triphosphoric acid.

6. A composition of matter as recited in claim 3 in which said acid is pyrophosphoric acid.

7. A composition of matter comprising the substantially neutral hydroxy reaction product of an alkylene oxide with a phosphorus acid selected from the group consisting of phosphorus acids which correspond to a mixture of from 75–90% by weight of phosphorus pentoxide with from 10–25% by weight of water and partial alkyl esters of said acids having a residue after esterification of at least one OH group per phosphorus atom, said hydroxy reaction product containing at least one reacted epoxy group per hydroxyl equivalent of said acid.

8. A hydroxyalkyl polyphosphate produced by the reaction of a polyphosphoric acid which corresponds to a mixture of from 75–90% by weight of phosphorus pentoxide with from 10–25% by weight of water with a stoichiometric excess of a vicinal monoepoxide.

9. A hydroxyalkyl polyphosphate produced by the reaction of a polyphosphoric acid with a stoichiometric excess of a vicinal monoepoxide, said vicinal monoepoxide being ethylene oxide.

10. A hydroxyalkyl polyphosphate produced by the reaction of a polyphosphoric acid which corresponds to a mixture of from 75–90% by weight of phosphorus pentoxide with from 10–25% by weight of water with a stoichiometric excess of a vicinal monoepoxide, said vicinal monoepoxide being propylene oxide.

11. A hydroxylalkyl polyphosphate produced by the reaction of a polyphosphoric acid which corresponds to a mixture of from 75–90% by weight of phosphorus pentoxide with from 10–25% by weight of water with a stoichiometric excess of a vicinal monoepoxide, said vicinal monoepoxide being epichlorohydrin.

12. A hydroxyalkyl polyphosphate produced by the reaction at a temperature of from 50–500° F. of a polyphosphoric acid which corresponds to a mixture of from 75–90% by weight of phosphorus pentoxide with from 10–25% by weight of water with an excess of a vicinal monoepoxide sufficient to produce a substantially neutral product.

References Cited

UNITED STATES PATENTS 2,979,523   4/1961   Cantrall et al. _____ 260—978 X

CHARLES B. PARKER, *Primary Examiner.*

A. H. SUTTO, *Assistant Examiner.*

UNITED STATES PATENT OFFICE
CERTIFICATE OF CORRECTION

Patent No. 3,369,060                     February 13, 1968

Paul E. Pelletier et al.

It is hereby certified that error appears in the above numbered patent requiring correction and that the said Letters Patent should read as corrected below.

Column 2, line 12, for "along" read -- alone --; line 13, for "wtih polyisocyanates or in admixtures" read -- with polyisocyanates or in admixture --; line 21, for "D365-56T" read -- D635-56T --; column 5, lines 39 and 40, for "isocyanates" read -- isocyanate --; line 55, for "material" read -- materials --; line 57, for fluirine" read -- fluorine --; column 6, line 6, for "ethers" read -- esters --; line 43, after "acid" insert -- which corresponds to a mixture of from 75-90% by weight of phosphorus pentoxide with from 10-25% by weight of water --.

Signed and sealed this 29th day of April 1969.

(SEAL)
Attest:

EDWARD M.FLETCHER,JR.                EDWARD J. BRENNER
Attesting Officer                     Commissioner of Patents